United States Patent
Lee et al.

(10) Patent No.: US 10,089,062 B2
(45) Date of Patent: Oct. 2, 2018

(54) DISPLAY DEVICE AND CONTROL METHOD THEREOF

(71) Applicant: LG ELECTRONICS INC., Seoul (KR)

(72) Inventors: Chanhaeng Lee, Seoul (KR); Heawon Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 47 days.

(21) Appl. No.: 15/117,924

(22) PCT Filed: Aug. 25, 2014

(86) PCT No.: PCT/KR2014/007861
§ 371 (c)(1),
(2) Date: Aug. 10, 2016

(87) PCT Pub. No.: WO2015/122585
PCT Pub. Date: Aug. 20, 2015

(65) Prior Publication Data
US 2017/0010855 A1    Jan. 12, 2017

(30) Foreign Application Priority Data
Feb. 11, 2014  (KR) .................. 10-2014-0015728

(51) Int. Cl.
*G06F 17/00*    (2006.01)
*G06F 3/16*    (2006.01)
(Continued)

(52) U.S. Cl.
CPC ............. *G06F 3/165* (2013.01); *H04N 5/642* (2013.01); *H04R 3/00* (2013.01); *H04R 3/12* (2013.01);
(Continued)

(58) Field of Classification Search
CPC ..................... H04R 2499/15; G06F 1/1605
See application file for complete search history.

(56) References Cited

U.S. PATENT DOCUMENTS

| | | | |
|---|---|---|---|
| 2004/0151325 | A1 | 8/2004 | Hooley et al. |
| 2008/0137097 | A1 | 6/2008 | Tanaka |

(Continued)

FOREIGN PATENT DOCUMENTS

| | | |
|---|---|---|
| CN | 102905091 | 1/2013 |
| CN | 103294381 | 9/2013 |

(Continued)

OTHER PUBLICATIONS

International Search Report and Written Opinion dated Dec. 16, 2014 issued in Application No. PCT/KR2014/007861 (Full English Text).

(Continued)

*Primary Examiner* — Thomas Maung
(74) *Attorney, Agent, or Firm* — KED & Associates LLP

(57) ABSTRACT

A display device and a control method thereof are disclosed. The display device comprises: a body with a display on the front side; at least one speaker provided on at least one side of the body; at least one sensor configured to measure the distance from the body to an adjacent face; and a controller configured to change the quality of sound output through the at least one speaker based on the distance measured by the at least one sensor. Accordingly, sound can be altered and output based on the distance between the display device and the adjacent face.

9 Claims, 8 Drawing Sheets

(51) Int. Cl.
   *H04R 3/12*    (2006.01)
   *H04R 3/00*    (2006.01)
   *H04R 29/00*   (2006.01)
   *H04N 5/64*    (2006.01)
   *H04R 5/02*    (2006.01)
   *H04S 7/00*    (2006.01)

(52) U.S. Cl.
   CPC ............ *H04R 5/02* (2013.01); *H04R 29/001* (2013.01); *H04S 7/307* (2013.01); *H04R 2201/025* (2013.01); *H04R 2430/01* (2013.01); *H04R 2499/15* (2013.01)

(56) References Cited

U.S. PATENT DOCUMENTS

2009/0196428 A1*  8/2009  Kim .................. H04R 3/04
                                                    381/17
2011/0211121 A1*  9/2011  Lim .................. H04R 3/04
                                                    348/578
2012/0106747 A1*  5/2012  Crockett ............ H04S 7/301
                                                    381/57

FOREIGN PATENT DOCUMENTS

| | | |
|---|---|---|
| EP | 1 667 488 | 6/2006 |
| EP | 2 037 678 | 3/2009 |
| EP | 2362682 | 8/2011 |
| JP | H08-116352 | 5/1996 |
| JP | 2007-243398 | 9/2007 |
| JP | 2012-244336 | 12/2012 |
| WO | WO2011011438 | 1/2011 |
| WO | WO 2013/006323 | 1/2013 |

OTHER PUBLICATIONS

European Search Report dated Sep. 18, 2017 issued in Application No. 14882562.3.
Chinese Office Action dated May 31, 2018 issued in Application No. 201480075232.1.

* cited by examiner

[Fig. 1]
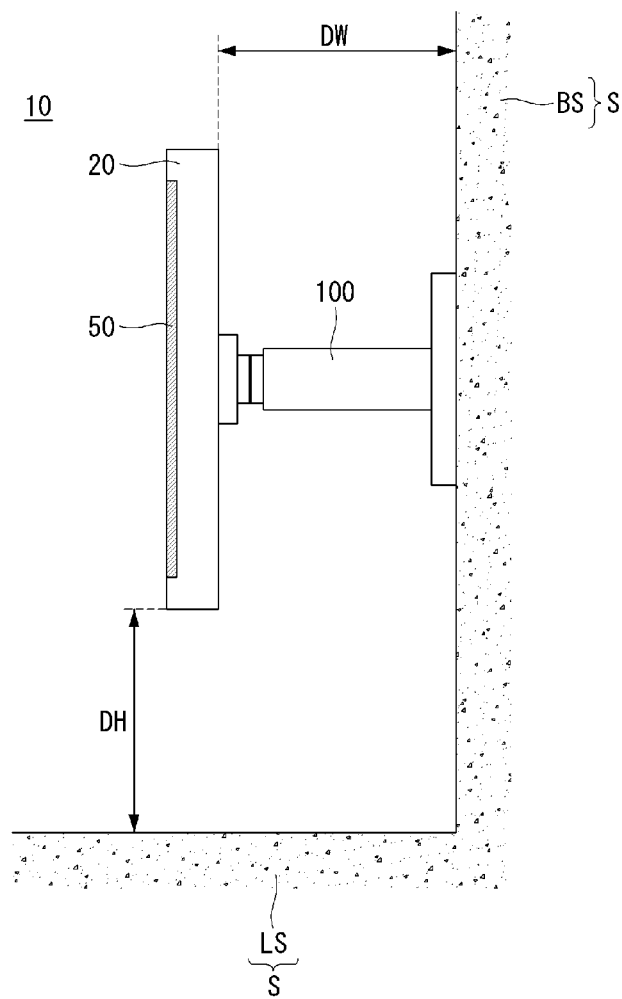

[Fig. 2]
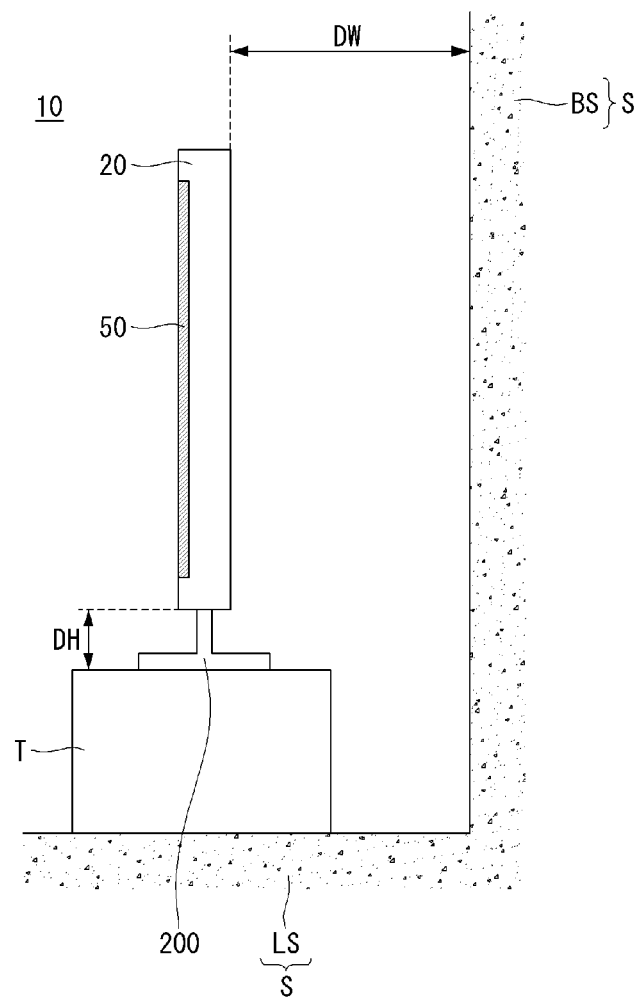

[Fig. 3]
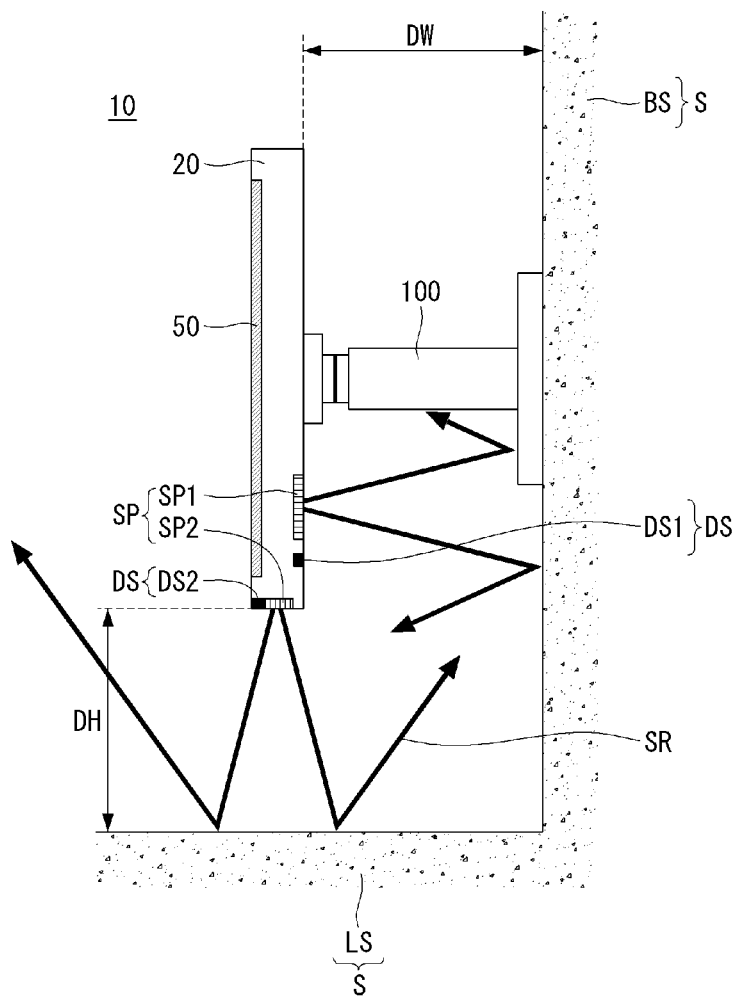

[Fig. 4]
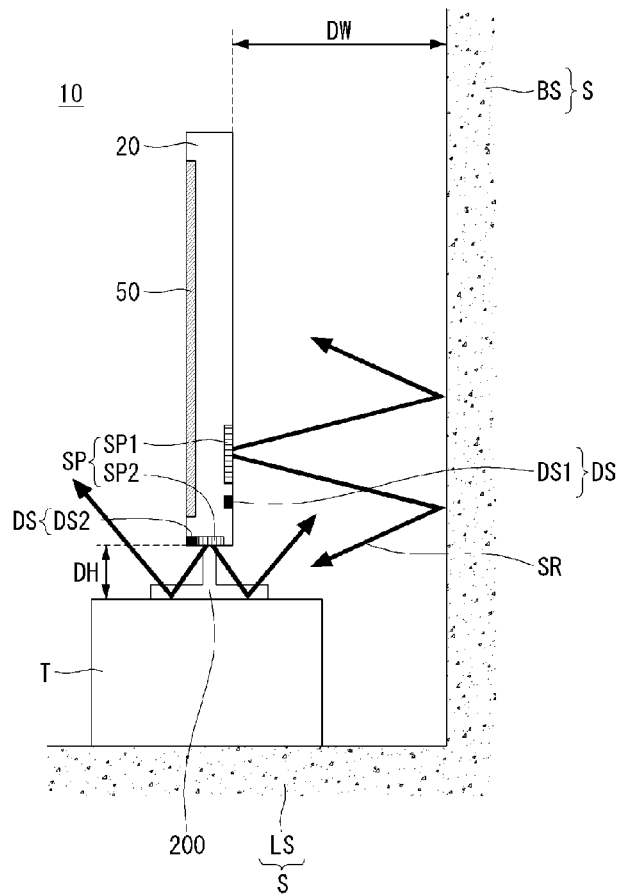
[Fig. 5]
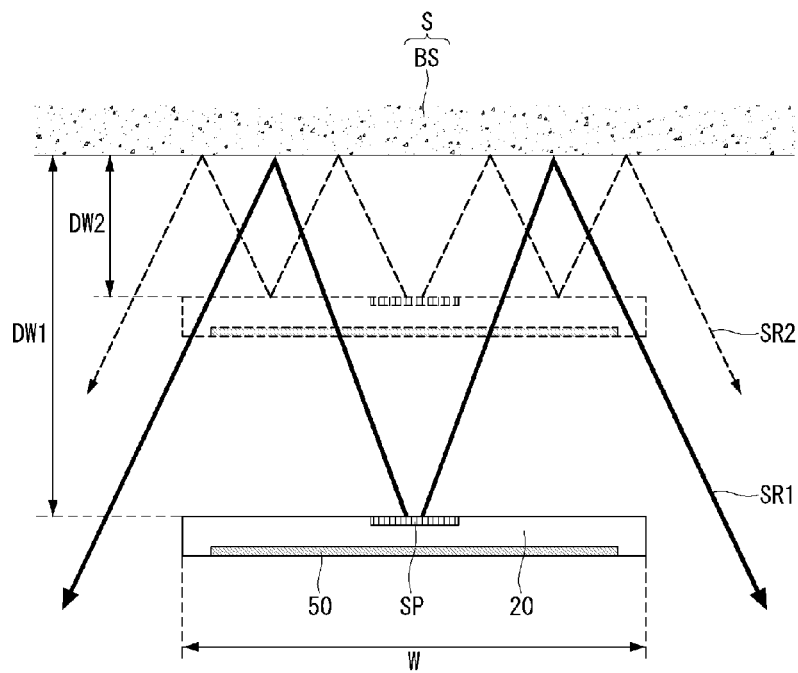

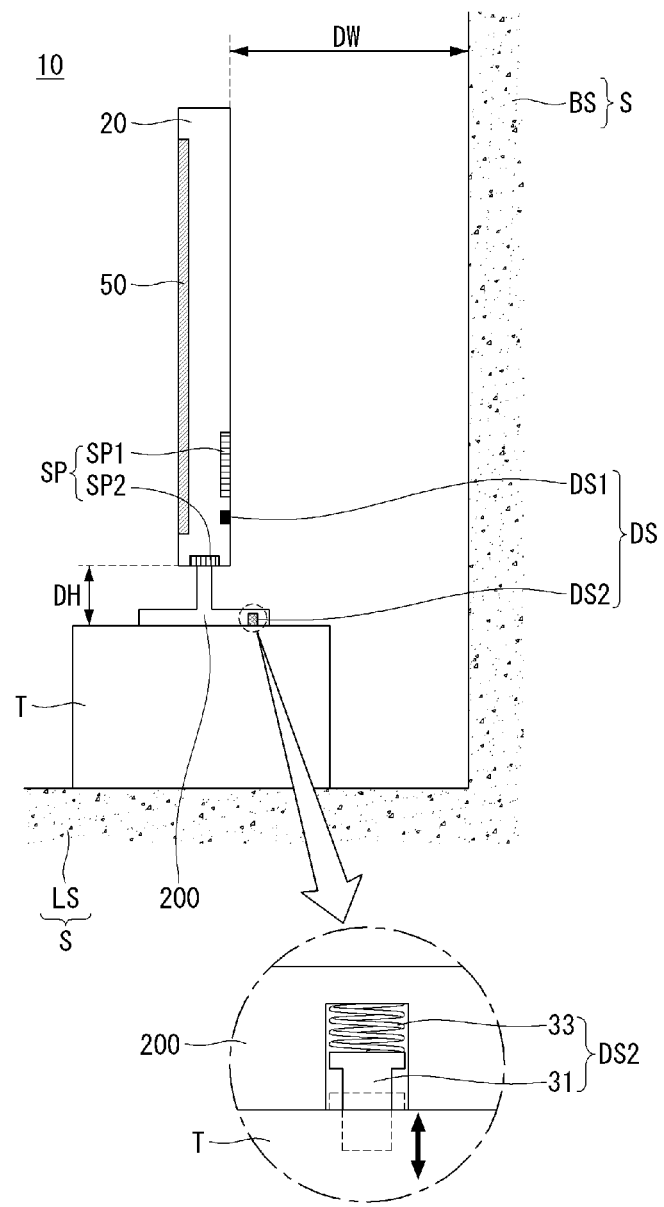
[Fig. 6]

[Fig. 7]
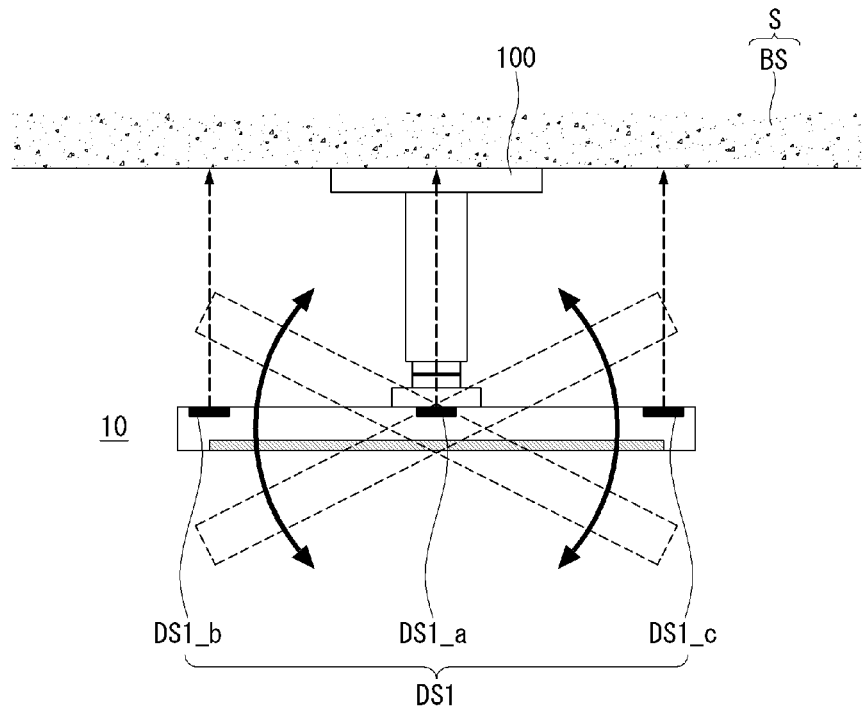
[Fig. 8]
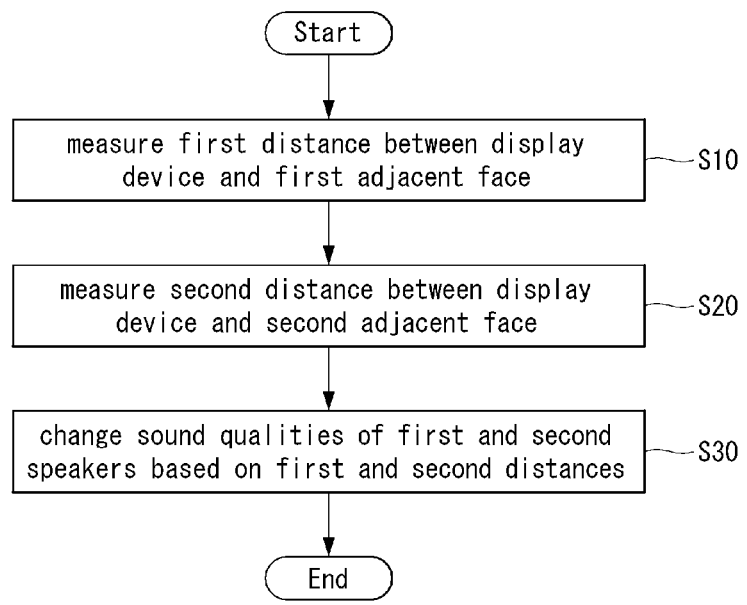

[Fig. 9]
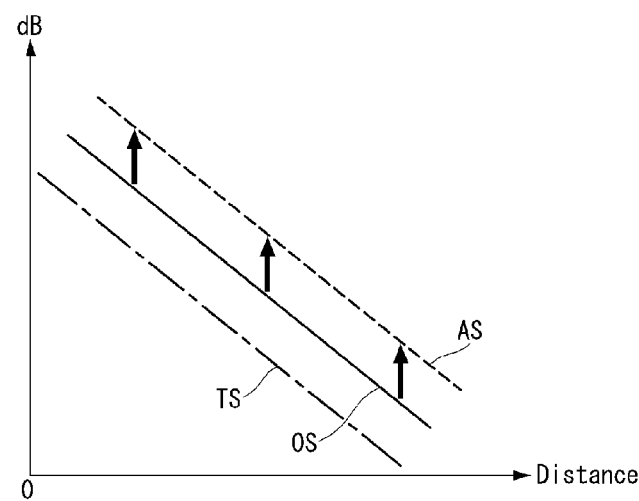
[Fig. 10]
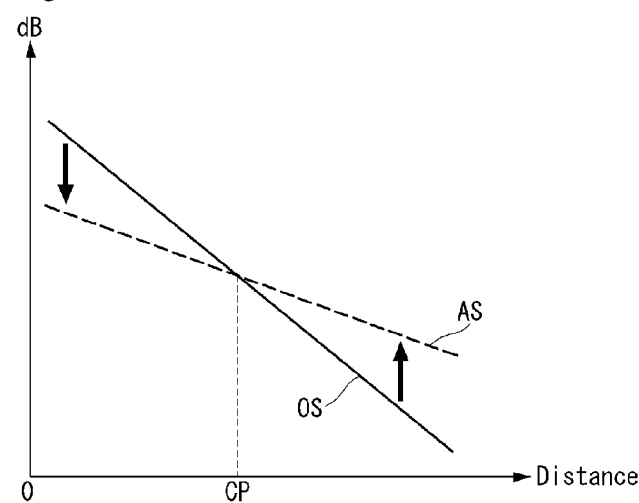
[Fig. 11]
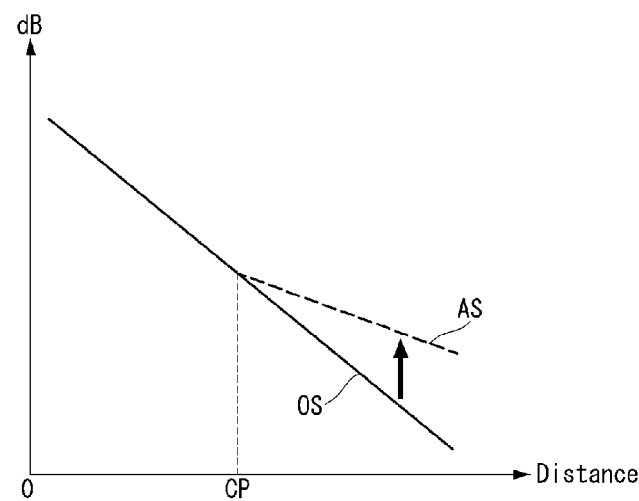

[Fig. 12]
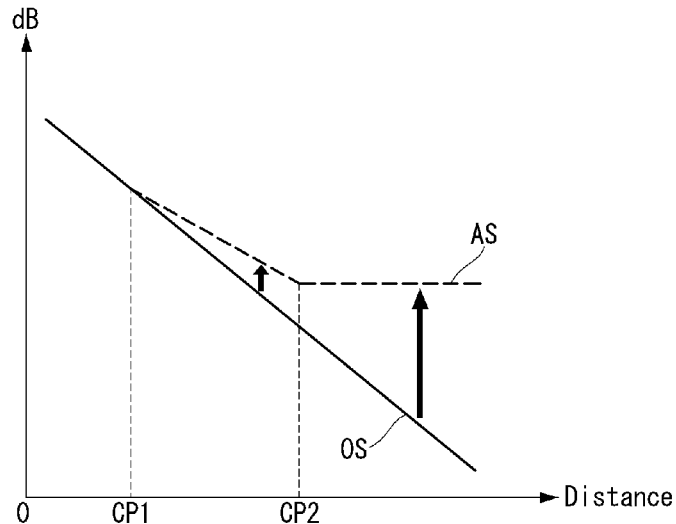
[Fig. 13]
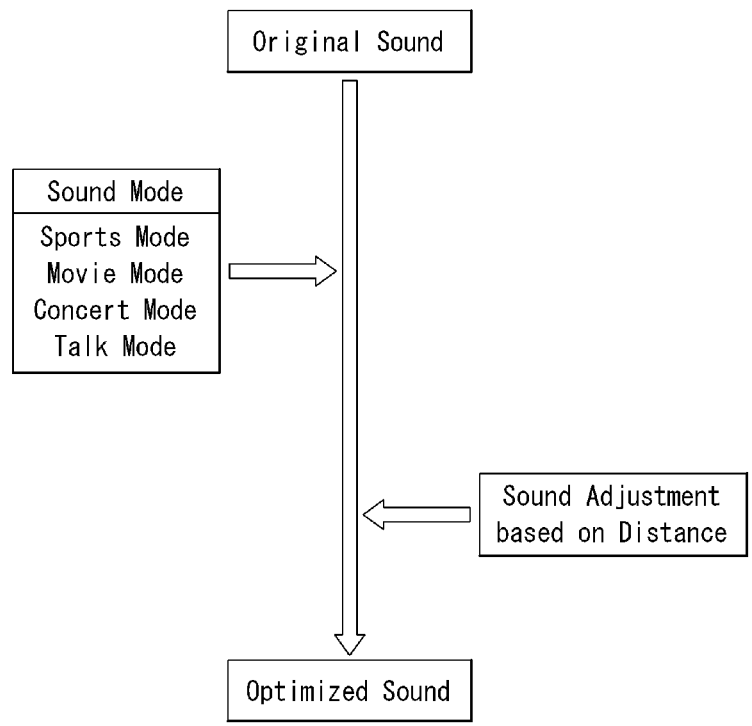

DISPLAY DEVICE AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2014/007861, filed Aug. 25, 2014, which claims priority to Korean Patent Application No. 10-2014-0015728, filed Feb. 11, 2014, whose entire disclosures are hereby incorporated by reference.

TECHNICAL FIELD

The present invention relates to a display device and a control method thereof, and more particularly, to a display device which is capable of outputting different sounds depending on the distance between the display device and an adjacent face, and a control method thereof.

BACKGROUND ART

As the functions of display devices, such as personal computers, laptops, mobile phones, TVs, etc., have become diversified, display devices are implemented in the form of a multimedia player having comprehensive functions such as capturing still and video images, playing music or video files, playing games, receiving broadcasts, and the like.

Display devices may be divided into mobile terminals and stationary terminals according to mobility. Mobile terminals may be divided into handheld terminals and vehicle mount terminals according to whether or not a user can carry it with them.

In order to support and increase the functionality of display devices, the improvement of structural parts and/or software parts of the display devices can be taken into account.

DISCLOSURE OF INVENTION

Technical Problem

An aspect of the present invention is to provide a display device and a control method thereof, and more particularly, to a display device which is capable of outputting different sounds depending on the distance between the display device and an adjacent face, and a control method thereof.

Solution to Problem

An exemplary embodiment of the present invention provides a display device comprising: a body with a display on the front side; at least one speaker provided on at least one side of the body; at least one sensor configured to measure the distance from the body to an adjacent face; and a controller configured to change the quality of sound output through the at least one speaker based on the distance measured by the at least one sensor.

The sensor may be configured to measure the distance from the body to at least one part of the adjacent face behind or below the body.

The sensor may comprise: a first sensor configured to sense contact with the adjacent face; and a second sensor configured to sense the distance to the adjacent face in a non-contact manner.

The at least one speaker may comprise: a first speaker on the back face of the body; and a second speaker on the bottom face of the body, and the controller may be configured to make the first and second speakers differ in sound quality.

The controller may be configured to change the sound quality of the at least one speaker in accordance with at least either the measured distance, or the width of the display device, or the location of the adjacent face.

The sensor on the back face of the body may be located at the center of the back face of the body where a bracket is fastened to fix the display device to the adjacent face.

The sensor on the back face of the body may be located near at least one of the left and right edges of the display device.

The controller may be configured to alter at least part of the sound to be output through the at least one speaker.

The controller may be configured to alter the sound in different ways for at least two parts based on the relationship between the measured distance and a preset distance and output the altered sound to the speaker.

The controller may be configured to alter at least part of the sound and output the same to the speaker if the measured distance exceeds the preset distance.

The controller may be configured to alter at least part of the sound and output the same to the speaker by using multiple criteria based on the measured distance.

The controller may be configured to alter the sound to be output through the at least one speaker according to the sound mode for the display device and based on the measured distance.

The controller may be configured to substantially change the sound quality in real time if the measured distance is changed.

Another exemplary embodiment of the present invention is to provide a control method of a display device, the method comprising: measuring the distance from the display device to at least one adjacent face around the display device; changing the quality of sound output based on the measured distance; and outputting a sound of different quality to a speaker.

In the measuring, the distance from the display device to at least one part of the adjacent face behind or below the display device may be measured.

In the changing, at least two of multiple speakers included in the display device may output different sounds.

In the changing, at least part of the sound to be output through at least one speaker may be altered and output to the speaker.

In the changing, at least part of the sound may be altered and output to the speaker if the measured distance exceeds the preset distance.

The control method may further comprise altering the sound to be output through the at least one speaker according to the sound mode for the display device.

In the changing, the sound quality may be substantially changed in real time if the measured distance is changed.

Advantageous Effects of Invention

A display device and a control method thereof according to the present invention have the advantage of outputting different sounds depending on the distance between the display device and an adjacent face.

BRIEF DESCRIPTION OF DRAWINGS

FIGS. 1 and 2 are views illustrating the installed condition of a display device according to one exemplary embodiment of the present invention;

FIGS. 3 to 5 are views illustrating the propagation of sound in the display device of FIGS. 1 and 2;

FIGS. 6 and 7 are views illustrating the position of sensors of the display device according to one exemplary embodiment of the present invention;

FIG. 8 is a flowchart illustrating operation of the display device according to one exemplary embodiment.

FIGS. 9 to 12 are views illustrating a change in sound quality of the display device according to one exemplary embodiment of the present invention; and FIG. 13 is a view illustrating a sound quality change process for the display device according to one exemplary embodiment of the present invention.

MODE FOR THE INVENTION

The above objects, characteristic, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. Wherever possible, the same reference numbers will be used throughout the drawings to refer to the same or like parts. Furthermore, a detailed description of the known functions or elements pertinent to the present invention will be omitted if it is deemed to make the gist of this document unnecessarily vague. Ordinal numbers (for example, first and second) used in the course of a description of this specification are only identification symbols for distinguishing one element from the other element.

Hereinafter, a display device related to the present invention will be described in more detail with reference to the accompanying drawings. The suffixes 'module' and 'unit' for the elements used in the following description are given or used in common by considering facilitation in writing this disclosure only but fail to have meanings or roles discriminated from each other.

The display device to be described in this specification may include a cellular phone, a smartphone, a laptop computer, a digital broadcasting terminal, personal digital assistants (PDA), a portable multimedia player (PMP), a navigation system and/or so on.

Except for a case applicable to a mobile terminal only, it is apparent to those skilled in the art that the configurations according to an embodiment described in this disclosure is applicable to such a stationary terminal as a digital TV, a desktop computer and the like.

FIGS. 1 and 2 are views illustrating the installed condition of a display device according to one exemplary embodiment of the present invention.

As shown in FIG. 1, the display device 10 may be installed on an adjacent face S. For example, the display device 10 may be fixed to a wall surface BS by connecting an installation bracket 100 installed on the wall surface BS to a body 20.

The display device 10 fixed onto the wall surface BS may be separated from the adjacent face S by predetermined distances. For example, the display device 10 may be separated from the wall surface BS by distance DW and from a bottom surface LS by distance DH.

The separation distance may depend on the condition of the installation bracket 100. For example, the installation bracket 100 may expand and contract, move up and down, or tilt to the left or right, according to the user's selection. The distance between the display device 10 and the adjacent face S may vary depending on whether the installation bracket 100 expands and contracts or tilts.

If the distance between the display device 10 and the adjacent face S is varied, the quality of sound produced by the speaker of the display device 10 also may be varied. For example, a variation of the angle and level of a sound reflected by the adjacent face S can change the quality of sound the operator of the display device 10 hears. A change in sound quality may lead to an obstacle to enjoying viewing in the best condition. For example, an echo effect might be added to the original sound, or the sound might get smaller or bigger. This depends on factors like the material of the adjacent face S, the distance to the adjacent face S, etc. This also depends on the type of speaker that produces sound. For example, a woofer, which produces low-to-medium pitch sounds, may be further affected by the distance between the display device 10 and the adjacent face S.

A change in sound quality with respect to the distance between the display device 10 and the adjacent face S will be clearly understood by taking into consideration the fact that the bezel around a display 50 on the front side of the body 20 is getting slimmer and the speaker tends to be installed on the back face and/or lower face of the display device 10 more and more. As the speaker is located on the back face and/or lower face of the display device 10, the sound produced from the speaker may be reflected against the adjacent face S and transmitted to the operator. Accordingly, the quality of sound transmitted to the operator may vary with the distance between the display device 10 and the adjacent face S.

As shown in FIG. 2, the display device 10 may be placed on a table T or the like. That is, the display device 10 may be placed on the table T or the like with a stand 200 fastened to the body 20 of the display device 10. If the display device 10 is placed using the stand 200, the distance between the display device 10 and the table T may be determined by the size of the stand 200. For example, the distance DH corresponding to the size of the stand 200 may become the distance from the display device 10 to the bottom surface LS.

If the display device 10 is placed using the stand 200, the distance from the display device 10 to the table T may be relatively small. The reflection distance, reflection amount, etc of the sound produced from the speaker may be different as compared to when the display device 10 is installed using the installation bracket 100. A change of reflection distance, etc may change the quality of sound the user hears, even with the same sound. The display device 10 according to one exemplary embodiment of the present invention can automatically optimize sound quality depending on the installed condition of the display device 10. Accordingly, the user does not have to set sound quality.

FIGS. 3 to 5 are views illustrating the propagation of sound in the display device of FIGS. 1 and 2.

As shown in these drawings, the display device 10 according to one exemplary embodiment of the present invention can detect the distance between the display device 10 and the adjacent face S.

As shown in FIG. 3, the display device 10 may be fastened to the wall surface BS, which is part of the adjacent face S, by the installation bracket 100. As described above, the distance between the display device 10 fastened by the installation bracket 100 and the adjacent face S may vary depending on the condition of the installation bracket 100.

At least one speaker SP may be provided at the display device 10. The speaker SP may be located on the back face and/or lower face of the display device 10 due to the growing trend toward slimmer bezels. For example, a first speaker SP1 may be located on the back surface of the display device 10 and a second speaker SP2 may be located on the back surface of the display device 10.

The first speaker SP1 may produce a sound toward the wall surface BS. The sound produced toward the wall surface BS may be reflected once or several times and transmitted to the operator, depending on the distance DW between the display device 10 and the wall surface BS.

Sound energy may be attenuated every time it is reflected. For example, assuming that the distance between a speaker and a viewer is Dd and the path length of a reflected sound is Dr, the level of the reflected sound may be lowered than the sound directly coming from the speaker S by 20 log (Dr/Dd) dB. Also, assuming that the rate of sound energy absorption at a reflection point is K, each time the sound is reflected, the sound energy may become smaller by −10 log(1−K) dB and the sound may delay by (Dr−Dd)/340 seconds.

As the initial energy of the sound is attenuated by sound reflection, the quality of sound the user hears will vary even when the speaker S produces sounds with the same loudness and the same tone.

At least one sensor DS may be provided at at least one point of the display device 10. The sensor DS is able to detect the distance between the display device 10 and the adjacent face S.

The sensor DS may comprise an optical sensor, an infrared sensor, an ultrasonic sensor, a contact sensor, etc. For example, a first sensor DS1 located at the back of the display device 10 may be an infrared sensor or the like capable of measuring distance in a non-contact manner. For the display device 10 fixed by the installation bracket 100, a second sensor DS2 located at the bottom of the display device 10 may be likewise an infrared sensor or the like which is capable of measuring distance in a non-contact manner.

Once the distance from the display device 10 to the wall surface BS is measured, a controller of the display device 10 may change the initial sound produced from the speaker S by taking the amount of reflection over distance into consideration. The number of reflections, i.e., the amount of reflection, may be estimated based on the distance between the display device 10 and the wall surface BS. That is, once the distance DW is figured out, the number of reflections can be estimated by taking the overall size of the display device 10 and/or the position of the first speaker SP1 into consideration.

The controller may calculate the quality of sound the operator will actually hear, based on the calculated number of reflections or the like. The controller may compare the quality of sound the operator will actually hear with the sound quality intended by the operator. The controller may adjust the sound produced from the speaker SP so as to make the actually sound quality and the intended sound quality equal.

The controller may make the sound quality of the first speaker SP1 different from the sound quality of the second speaker SP2. The distance DW from the first speaker SP1 to the wall surface BS and the distance LS from the second speaker SP2 to the bottom surface LS may be different from each other. The distance difference may cause a difference in the amount of reflection. Moreover, the first and second speakers SP1 and SP2 may have different features. For example, the first speaker SP1 may be a speaker that produces a higher-pitch sound, and the second speaker SP2 may be a speaker that produces a lower-pitch sound. In addition, the areas of the back face and/or lower face of the display device 10 may be different from each other. Accordingly, the friction between a reflected sound and the display device 10 may vary. Therefore, the controller may make the first and second speakers SP1 and SP2 differ in sound quality, depending on distance, position, and features of the speakers.

As shown in FIG. 4, the display device 10 according to one exemplary embodiment of the present invention may be installed on a table T or the like. If the display device 10 is installed on the table T or the like, the distance DH between the display device 10 and the bottom may be measured through the second sensor DS2 located at the bottom of the display device 10. The controller may adjust the quality of sound produced from the second speaker SP2, based on the measured distance.

As shown in FIG. 5, the reflection characteristics of sound may vary with the distance between the display device 10 and the adjacent face 10.

If the distance between the display device 10 and the adjacent face S is DW1, the sound produced from the speaker SP may be propagated to the front face of the display device 10 along a first sound path SR1. If the distance between the display device 10 and the adjacent face S is DW2, the sound produced from the speaker SP may be propagated to the front face of the display device 10 along a second sound path SR2. That is, different sound paths with different numbers of reflections may be used depending on the width W and distance of the display device 10. As described above, a change in the number of reflections may change the loudness, quality, etc of sound. The display device 10 according to one exemplary embodiment of the present invention may estimate a sound path based on the measured distance, etc and adjust the sound of the speaker SP along the estimated sound path.

FIGS. 6 and 7 are views illustrating the position of sensors of the display device according to one exemplary embodiment of the present invention.

As shown therein, the second sensor DS2, out of the sensors DS, may be a contact sensor. For the display device 10 according to one exemplary embodiment of the present invention, sensors DS may be located in the best positions where the position of the display device 10 can be measured.

As shown in FIG. 6, the second sensor DS2 may be a sensor which estimates the presence of a bottom surface at the distance DH, which is the length of the stand 200, upon receipt of a contact signal.

The contact sensor may comprise a main body 31 and an elastic body 33. The elastic body 33 may press the main body 31 downward. If the display device 10 is to be placed on the table T, the main body 31 may be inserted into the stand 200. When a signal is generated by the insertion of the main body 31 into the stand 200, the controller may determine that the display device 10 is placed on the table T. If the display device 10 is placed on the table T, the controller may determine that the distance between the display device 10 and the table T equals the length DH of the stand 200.

As shown in FIG. 7, the first sensor DS1 located on the back face of the display device 10 according to one exemplary embodiment of the present invention may be placed in a proper position where the distance between the display device 10 and the adjacent face S can be measured.

The first sensor DS1 may comprise at least one of the following: a central sensor DS1_a located at the center of the display device 10 and lateral sensors DS1_b and DS1_c located on the left and right sides of the display device 10.

The central sensor DS1_a may be located near a fixing bracket 100 for fixing the display device 100 to the adjacent face S. For example, the central sensor DS1_a may be located in the central region of the display device 100. If the central sensor DS1_a is located in the central region of the display device 10, the effect of changes in the position of the display device 100 caused by the fixing bracket 100 can be minimized.

The lateral sensors DS1b and DS1_c may be located on or near the left and right edges of the display device 10. The display device 10 may tilt to the left and right and/or up and down with respect to the fixing bracket 100. The lateral sensors DS1_b and DS1_c may accurately detect the movement of the display device 10 using the fixing bracket 100.

Speakers may be located on the left and right sides of the back face of the display device 10. If there are multiple lateral sensors DS1_b and DS1_c, the controller may adjust the sound quality of the speakers on the left and right sides of the back face of the display device 10 based on a measured distance. That is, the speakers on the left and right sides of the back face of the display device 10 may differ in sound quality.

FIG. 8 is a flowchart illustrating the operation of the display device according to one exemplary embodiment of the present invention.

As shown therein, the controller of the display device 10 according to one exemplary embodiment of the present invention may perform the step S10 of measuring a first distance between the display device 10 and a first adjacent face and the step of measuring a second distance between the display device 10 and a second adjacent face.

The first adjacent face may be the back face of the display device 10, and the second adjacent face may be the bottom face of the display device 10. However, the first and second adjacent faces are not limited to them. For example, the first or second adjacent face may be the top face or front face of the display device 10.

The distance from the display device 10 to the first adjacent face and/or the second adjacent face may be measured by direct and/or indirect methods. For example, the distance from the display device 10 to the first adjacent face and/or the second adjacent face may be measured using an optical sensor or a contact sensor.

The step S30 of changing the sound qualities of the first and second speakers based on the first and second distances may be performed.

The first speaker may be a speaker on the back face of the display device 10, and the second speaker may be a speaker on the bottom face of the display device 10.

Multiple speakers may be provided. For example, speakers including at least one back speaker, at least one bottom speaker, and at least one front speaker may be provided in multiple positions. The controller may make the sound qualities of multiple speakers different from each other, based on information such as a measured distance.

FIGS. 9 to 12 are views illustrating a change in sound quality of the display device according to one exemplary embodiment of the present invention.

As shown in these drawings, the controller of the display device 10 according to one exemplary embodiment of the present invention may tune the speakers to get a different sound quality for a different measurement result.

As shown in FIG. 9, the sound produced from a speaker when there is no control operation according to one exemplary embodiment of the present invention may be viewed as the original sound OS. The original sound OS, after the sound pressure is attenuated along the transmission path, may be perceived in the form of transmitted sound TS by the operator. That is, a sound different from the sound initially intended to be transmitted may be transmitted to the operator. Accordingly, the controller may create an altered sound AS by changing the quality of the original sound OS depending on a measured distance. That is, it is possible to create an altered sound AS by reinforcing the original sound OS produced when there is no operation of the controller.

The altered sound AS may be uniformly created in the whole range of the original sound. That is, the whole sound range may be uniformly reinforced and output to the speaker by taking into consideration the degree of attenuation in the course of sound transmission to the operator.

As shown in FIG. 10, the controller may alter the original sound OS with respect to a specific point CP. This is based upon the fact that the distance between the display device 10 and the adjacent face S may vary greatly with respect to a specific point. The specific point may be determined by a test.

The controller may create the altered sound AS in different ways for the part before the specific point CP or the part after the specific point CP. For example, the pressure of the original sound OS may be decreased for the part before the specific point CP and increased for the part after the specific point CP.

As shown in FIG. 11, the controller may process the original sound OS in different ways for multiple specific points CP1 and CP2. For example, the altered sound AS may be created with different degrees of sound alteration for when the distance between the display device 10 and the adjacent face S is within the part before the first specific point CP1 or within the part after the second specific point CP2. Such an alteration applies when a change of sound with distance has multiple inflection points.

FIG. 13 is a view illustrating a sound quality change process for the display device according to one exemplary embodiment of the present invention.

As shown therein, the controller of the display device 10 according to one exemplary embodiment of the present invention may create an optimized sound by adjusting the original sound.

The original sound may be altered according to the sound mode set on the display device 10. For example, the original sound may be primarily adjusted to a specific sound mode including the sports mode, the movie mode, the concert mode, or the talk mode according to a control signal from the controller and/or the operator's selection.

The original sound primarily adjusted based on sound mode may be secondly adjusted based on distance. That is, the original sound adjusted based on sound mode may be re-adjusted so as to be transmitted to the operator while maintaining its effect. As described above, the original sound may be adjusted in such a way that reinforces or weakens at least part of the sound based on the distance between the display device 10 and the adjacent face S. The first and/or second adjustments of the original sound may create an optimized sound. The controller may cause the optimized sound to be output from the speaker.

While the invention has been described in detail with respect to specific embodiments thereof, it will be apparent to those skilled in the art that various alterations, modifications and other changes may be made without departing from the spirit and scope of the present invention. It is therefore intended that all such alterations, modifications or other changes be encompassed by the claims.

The invention claimed is:
1. A display device comprising:
a body having a display on the front side;
a stand that supports the body, the stand including a bottom surface and a hole formed on the bottom surface;

a first sensor at the bottom surface of the stand, the first sensor includes a main body that moves along the hole and an elastic body that presses the main body in a first direction, the first sensor that senses a movement of the main body, relative to the bottom surface, in a second direction opposite to the specific direction, and that provides a signal based on the sensed movement;

a second sensor configured to measure a distance from the body to at least one part of an adjacent face behind or below the body; and a controller configured to change the quality of sound output through the at least one speaker when the controller determines a specific distance based on the signal from the first sensor, wherein the at least one speaker comprises:

a first speaker on the back of the body; and a second speaker on the bottom of the body, and the controller is configured to make the first and second speakers differ in sound quality based on the distance measured by the second sensor.

2. The display device of claim 1, wherein the controller is configured to change the sound quality of the at least one speaker in accordance with at least either a measured distance, or a width of the display device, or a location of an adjacent face behind or below the body.

3. The display device of claim 1, wherein the second sensor is positioned on the back of the body, and wherein the second sensor is located near at least one of the left and right edges of the display device.

4. The display device of claim 1, wherein the controller is configured to alter at least part of the sound to be output through the at least one speaker.

5. The display device of claim 4, wherein the controller is configured to alter the sound in different ways based on the relationship between the measured distance and a preset distance and output the altered sound to the speaker.

6. The display device of claim 4, wherein the controller is configured to alter at least part of the sound and output the same to the speaker when the measured distance exceeds the preset distance.

7. The display device of claim 4, wherein the controller is configured to alter at least part of the sound and output the same to the speaker by using multiple criteria based on the measured distance.

8. The display device of claim 1, wherein the controller is configured to alter the sound to be output through the at least one speaker according to the sound mode for the display device and based on the measured distance.

9. The display device of claim 1, wherein the controller is configured to substantially change the sound quality in real time when the measured distance is changed.

* * * * *